US006293799B1

(12) United States Patent
Walker, II

(10) Patent No.: US 6,293,799 B1
(45) Date of Patent: Sep. 25, 2001

(54) METHOD OF APPLYING PIGMENTED MATERIAL TO A SCREEN TO CREATE AN ARTISTIC IMAGE AND THE RESULTING PIGMENTED SCREEN

(76) Inventor: Randall L. Walker, II, 1134 SW. Greenbriar Cove, Port St. Lucie, FL (US) 34986

( * ) Notice: Subject to any disclaimer, the term of this patent is extended or adjusted under 35 U.S.C. 154(b) by 0 days.

(21) Appl. No.: 09/542,507

(22) Filed: Apr. 3, 2000

Related U.S. Application Data

(63) Continuation-in-part of application No. 09/189,182, filed on Nov. 10, 1998.

(51) Int. Cl.[7] ........ B09B 11/10

(52) U.S. Cl. ........ 434/84; 434/81; 160/369; 160/368.1

(58) Field of Search ........ 434/81, 84; 160/369, 160/368.1, 371, DIG. 7; 442/173

(56) References Cited

U.S. PATENT DOCUMENTS

| | | | |
|---|---|---|---|
| 3,236,368 | * 2/1966 | Eisen . | |
| 3,261,393 | * 7/1966 | Templeton . | |
| 3,308,875 | * 3/1967 | Abrams . | |
| 3,701,207 | * 10/1972 | Conrad . | |
| 3,802,904 | * 4/1974 | Morrison . | |
| 4,034,494 | 7/1977 | Lane | 40/106.52 |
| 4,122,237 | 10/1978 | Kaiserman | 428/195 |
| 4,734,037 | 3/1988 | McClure | 434/236 |
| 5,003,715 | 4/1991 | Steiner | 40/442 |
| 5,152,089 | 10/1992 | Bellico | 40/443 |
| 5,228,879 | 7/1993 | Fromm | 446/219 |
| 5,657,563 | 8/1997 | Lane | 40/219 |

* cited by examiner

*Primary Examiner*—Jacob K. Ackun, Jr.
*Assistant Examiner*—Bena B. Miller
(74) *Attorney, Agent, or Firm*—Oltman, Flynn & Kubler

(57) ABSTRACT

A method is provided of placing pigmented material onto a screen mesh sheet made up of screen wires having forward surfaces and defining mesh openings between the screen mesh wires and having a screen mesh sheet forward face and a screen mesh sheet rearward face, using a foam sheet formed of yieldable material and having a foam sheet forward face and a foam sheet rearward face, and using a substantially planar support surface, comprising the steps of: placing the foam sheet rearward face against the substantially planar support surface; placing the screen mesh sheet rearward face against the foam sheet forward face; applying force against at least a region of the screen mesh sheet to receive the pigmented material, in the direction of the support surface, thereby pressing the region of the screen mesh sheet into the foam sheet forward face such that foam sheet material bulges into mesh openings in the screen mesh sheet; and spraying the pigmented material onto forward surfaces of the screen wires. A display apparatus is provided including a portion of mesh screen having two sides; a display comprising an image affixed directly to said portion of mesh screen; one of the sides being the application side of the mesh screen to which the display is affixed and visible; and a second side from which the display is not visible.

12 Claims, 2 Drawing Sheets

METHOD OF APPLYING PIGMENTED MATERIAL TO A SCREEN TO CREATE AN ARTISTIC IMAGE AND THE RESULTING PIGMENTED SCREEN

FILING HISTORY

This application is a continuation-in-part of application Ser. No. 09/189,182 filed on Nov. 10, 1998.

BACKGROUND OF THE INVENTION

1. Field of the Invention

The present invention relates generally to the field of stenciled artwork and methods of producing such artwork. More specifically the present invention relates to a method of applying one or more colors of dye to a screen mesh sheet to create an artistic image, so that the dye does not clog screen mesh openings and adheres to and is visible from only on the side of the screen mesh sheet to which it is applied. The present invention further relates to the resulting dyed screen mesh sheet.

The method includes the steps of wiping down a screen mesh sheet with a cleaning agent; placing a yieldable foam sheet on a substantially planar support surface; placing the screen mesh sheet face to face against the foam sheet; applying force against at least a region of the screen mesh sheet to be dyed in the direction of the support surface, thereby pressing the region of the screen mesh sheet into the foam sheet so that foam sheet material bulges into and preferably through the mesh openings in the screen mesh sheet, thereby obstructing applied dye from contacting the rearward surfaces of the screen wire making up the screen mesh sheet and the lateral surfaces of the screen wire facing adjacent strands of screen wire within the mesh openings; and applying a dye to forward surfaces of the screen wires using conventional dye spraying equipment and conventional spraying procedures. A stencil is preferably placed onto the screen mesh sheet forward face prior to spraying to create a desired dye pattern or image.

The resulting dyed screen mesh sheet presents an attractive and uniform dye image which contrasts in color or darkness with the screen mesh sheet is clearly visible from the sheet forward face and entirely invisible through the sheet rearward face, and in no way obstructs the view through the sheet. The screen wires may be formed of metal, plastic or other material.

2. Description of the Prior Art

There have long been methods of painting and dying patterns onto flexible sheet material, including screen mesh. Yet prior methods often clog the mesh openings, so that the view through the screen mesh sheet is marred. This substantial aesthetic defect is highly pronounced where the screen mesh is very fine.

Other screen covering devices and methods include Templeton, U.S. Pat. No. 3,261,393, issued on Jul. 19, 1966, for an apparatus and method for patching screens. Templeton is essentially a solid plate having an ornate shape with means for securing the plate onto a screen to cover a hole in the screen. The resulting Templeton screen presents an image which is visible from both sides of the screen and which obstructs the view through the screen. The butterfly patch silhouette shown in Templeton FIG. 2 is evidently solid, and thus can be seen very clearly from both sides of the screen. Templeton FIG. 6 shows a plate 14 having a free form shape rather than a butterfly shape, and shows plate fasteners 16. The plate 14 shape of FIG. 6 still shows through the screen in silhouette from the rearward side, and since the fasteners 16 are smaller than the plate 14, the plate shape showing through is not altered. Thus Templeton image does not vanish upon turning the screen around to view the second side, as the image does in the present invention.

Other prior art references pertaining to images created on sheet material generally are Donaldson, et al. U.S. Pat. No. 3,747,232, issued on Jul. 24, 1973 for a coloring set; Abrams, U.S. Pat. No. 3,308,875, issued on Mar. 14, 1967 for a decorative panel; Lane, U.S. Pat. No. 4,034,494, issued on Jul. 12, 1977 for a holiday light; and Keithley, U.S. Pat. No. 4,674,213, issued Jun. 23, 1987 for an extruded aluminum sign frame section.

It is thus an object of the present invention to provide a method of applying pigmented material such as vinyl dye to a screen mesh sheet which prevents the pigmented material from filling and closing mesh openings.

It is another object of the present invention to provide such a method which confines the applied pigmented material to the forward surfaces of the screen wires making up the screen mesh sheet, so that the image created by the pigmented material is visible from only the forward face of the sheet, and there is no evidence of the pigmented material or of an image when viewing the opposing, rearward face of the sheet.

It is still another object of the present invention to provide such a method which requires only inexpensive equipment to implement, which may be rapidly executed, which requires minimal skill to execute, and which is suitable for dying screen mesh sheets having a fine mesh so that greater color intensity is produced per unit area.

It is finally an object of the present invention to provide a display in the form of a screen mesh sheet having an image formed of pigmented material on at least a portion of one face of the sheet which does not intrude into or fill any screen mesh openings and which is visible from only one side of the screen mesh sheet.

SUMMARY OF THE INVENTION

The present invention accomplishes the above-stated objectives, as well as others, as may be determined by a fair reading and interpretation of the entire specification.

A method is provided of placing pigmented material onto a screen mesh sheet made up of screen wires having forward surfaces and defining mesh openings between the screen mesh wires and having a screen mesh sheet forward face and a screen mesh sheet rearward face, using a foam sheet formed of yieldable material and having a foam sheet forward face and a foam sheet rearward face, and using a substantially planar support surface, comprising the steps of: placing the foam sheet rearward face against the substantially planar support surface; placing the screen mesh sheet rearward face against the foam sheet forward face; applying force against at least a region of the screen mesh sheet to receive the pigmented material, in the direction of the support surface, thereby pressing the region of the screen mesh sheet into the foam sheet forward face such that foam sheet material bulges into mesh openings in the screen mesh sheet; and spraying the pigmented material onto forward surfaces of the screen wires.

The method preferably includes the additional step of wiping down a screen mesh sheet with a cleaning agent prior to placing the screen mesh sheet onto the foam sheet. The method optionally includes the still additional step of placing a stencil onto the screen mesh sheet forward face prior to spraying pigmented onto the screen mesh sheet, such that the stencil constrains subsequently sprayed pigmented material to create desired pigmented material patterns. The foam sheet preferably is formed of a soft, resilient and absorbent material which absorbs pigmented material. The method preferably includes the further step of cutting the stencil from a plastic sheet. The support surface preferably is substantially horizontal and is optionally a top surface of a table. The force applied to the screen mesh sheet preferably is the weight of the screen mesh sheet, and is preferably substantially uniformly distributed over the region of the screen mesh sheet to be sprayed with pigmented material.

The method preferably includes the additional steps of the step of inserting fasteners through the screen mesh sheet, thereby pressing the screen mesh sheet firmly against the foam sheet; and applying force against the screen mesh sheet using a press apparatus. The pigmented material preferably is a vinyl dye.

A resulting screen mesh sheet display preferably includes comprising an image affixed directly to a portion of mesh screen having two sides; one of the sides being the application side of the mesh screen to which the display is affixed and visible; and a second side from which the display is not visible. The image preferably includes an arrangement of at least one color selected to visibly contrast the mesh screen against which the at least one color is applied. The portion of the mesh screen may be installed in one of: a window and a porch.

A method is further provided of preparing a visible display comprising the steps of applying an arrangement of at least one color directly to one side of a mesh screen, the at least one color selected to visibly contrast the mesh screen. The application preferably involves the step of painting at least one color to the mesh screen.

A display apparatus is provided including a portion of mesh screen having two sides; a display comprising an image affixed directly to the portion of mesh screen; one of the sides being the application side of the mesh screen to which the display is affixed and visible; and a second side from which the display is not visible. The image preferably includes an arrangement of at least one color selected to visibly contrast the mesh screen against which the at least one color is applied. The portion of mesh screen preferably is installed in one of: a window and a porch.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
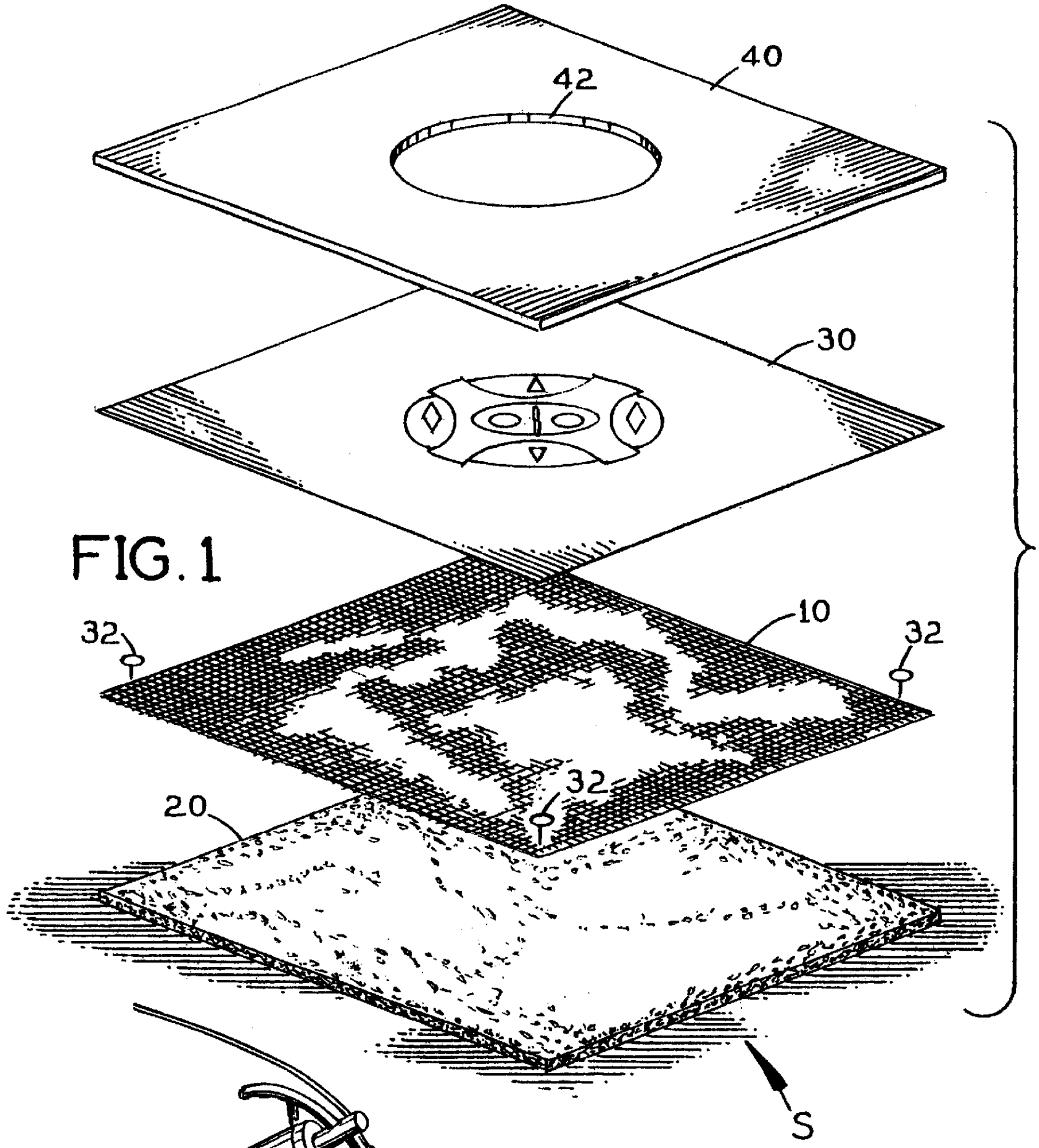
FIG. 1 is an exploded view of the preferred apparatus used to place dye onto a screen mesh sheet, including the foam sheet, the screen mesh sheet itself, the stencil, the fasteners and the metal plate press.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

Preferred Method

Figure 3:
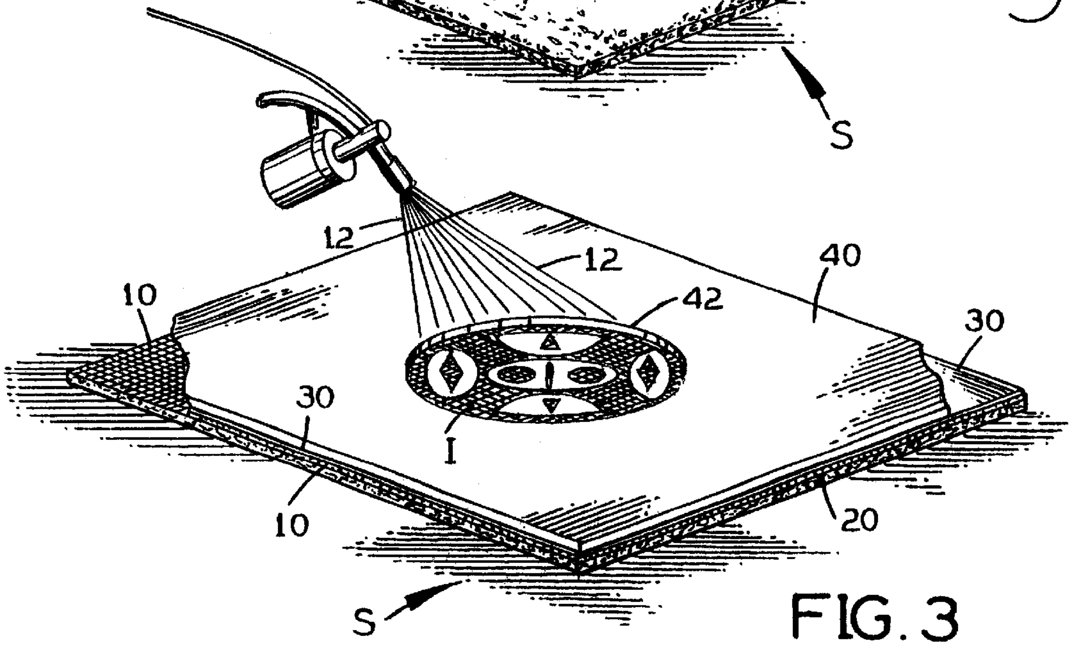
FIG. 3 is a perspective view of the assembled apparatus of FIG. 1, with dye being sprayed through the opening in the press plate, through the shaped opening in the stencil and onto the screen mesh sheet.
Figure 2:
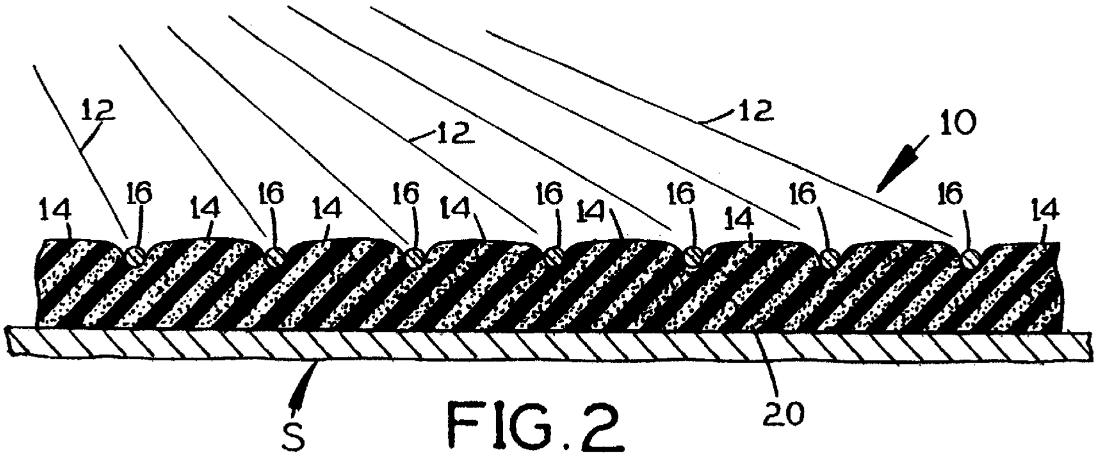
FIG. 2 is a cross-sectional side view of a segment of the screen mesh sheet and the foam sheet, showing how the foam sheet material bulges up through the screen mesh openings to limit the coverage of the sprayed dye.
Figure 4:
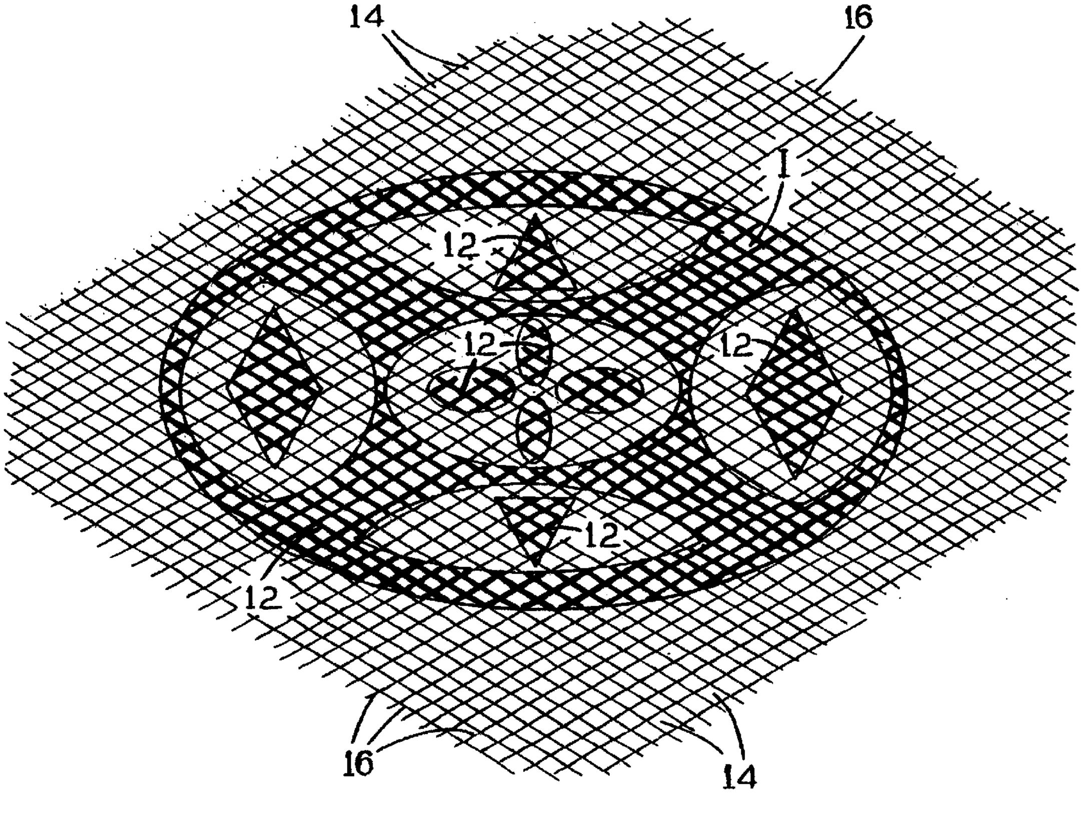
FIG. 4 is a perspective view of the resulting dye pattern or image on the screen mesh sheet.

A method is disclosed of applying one or more colors of a pigmented material such as a dye 12 to a screen mesh sheet 10 to create an artistic image I, so that the dye does not clog screen mesh openings 14 and adheres to and is visible from only the side of the screen mesh sheet 10 to which it is applied. See FIGS. 1–4. The present invention further relates to the resulting dyed screen mesh sheet 10.

The method includes the steps of wiping down a screen mesh sheet 10 with a cleaning agent; placing a yieldable foam sheet 20 on a substantially planar support surface S; placing the screen mesh sheet 10 face to face against the foam sheet 20; applying force against at least a region of the screen mesh sheet 10 to be dyed in the direction of the support surface S, thereby pressing the region of the screen mesh sheet 10 into the foam sheet 20 so that foam sheet 20 material bulges into and preferably through the mesh openings 14 in the screen mesh sheet 10, thereby obstructing applied dye 12 from contacting the rearward surfaces of the screen wire 16 making up screen mesh sheet 10 and the lateral surfaces of the screen wire 16 facing adjacent strands of screen wire 16 within the mesh openings 14; and applying a pigmented material such as a dye 12 to forward surfaces of the screen wires 16. Dye 12 may be applied using conventional dye spraying equipment such as air brushes and paint guns and conventional spraying procedures. A stencil 30 is preferably placed onto the screen mesh sheet 10 forward face prior to dye spraying to create desired dye images. This procedure may be performed a series of times with different color dyes 12 to create an image I of multiple colors.

The foam sheet 20 is preferably formed of a soft, resilient and porous materiel, such as DOUGLAS™ foam rubber pad, which absorbs dye 12 quickly. The stencil 30 is preferably cut out of a plastic sheet. The support surface S is preferably substantially horizontal and is optionally a table top. The force applied to press the screen mesh sheet 10 into the foam sheet 20 is preferably broadly and uniformly distributed over the region of the screen mesh sheet 10 to be dyed. Where the support surface S is substantially horizontal, the weight of the screen mesh sheet 10 itself is often sufficient to cause the foam sheet 20 material to bulge through mesh openings 14, and where a stencil 30 is used the weight of the stencil 30 enhances this applied force. Thumb tacks or other fasteners 32 are optionally inserted through the screen mesh sheet 10 into support surface S, preferably at its corners, to apply additional force against the screen mesh sheet 10 when necessary, and to secure the screen mesh sheet 10 against movement during dye application. Still alternatively, a press device is optionally used to press the stencil against the table top, thereby eliminating the need for fasteners, such as metal plate 40 with openings 42 to expose dye receiving areas of screen mesh sheet 10, is placed flat on top of the sheet 10. The preferred dye 12 is a vinyl dye, rather than a paint, because vinyl dye bonds strongly to screen mesh. Vinyl dye also increases the life of a screen mesh sheet 10 because it forms a layer which sun light and heat must destroy and dislodge before reaching and decaying fibers at the core of the screen wire 16. The screen mesh sheet 10 is preferably of a fine mesh so that wire 16 surfaces coated with the applied dye 12 are more concentrated for each unit area of the sheet 10 and thus produce deeper and richer dye 12 color to the viewer.

First Preferred Embodiment

The resulting display in the form of a dyed screen mesh sheet 10 presents an attractive and uniform dye image I which is clearly visible from the sheet 10 forward face and entirely invisible through the sheet 10 rearward face, and in no way obstructs the view through the sheet 10. The screen wires 16 may be formed of metal, plastic or other material.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A method of placing pigmented material onto a screen mesh sheet made up of screen wires having forward surfaces and defining mesh openings between the screen mesh wires and having a screen mesh sheet forward face and a screen mesh sheet rearward face, using a foam sheet formed of yieldable material and having a foam sheet forward face and a foam sheet rearward face, and using a substantially planar support surface, comprising the steps of:

placing the foam sheet rearward face against the substantially planar support surface;

placing the screen mesh sheet rearward face against the foam sheet forward face;

applying force against at least a region of the screen mesh sheet to receive the pigmented material, in the direction of the support surface, thereby pressing the region of the screen mesh sheet into the foam sheet forward face such that foam sheet material bulges into mesh openings in the screen mesh sheet;

and spraying the pigmented material onto forward surfaces of the screen wires.

2. The method of claim 1, comprising the additional step of:

wiping down a screen mesh sheet with a cleaning agent prior to placing the screen mesh sheet onto the foam sheet.

3. The method of claim 1, comprising the additional step of:

placing a stencil onto the screen mesh sheet forward face prior to spraying pigmented onto the screen mesh sheet, such that the stencil constrains subsequently sprayed pigmented material to create a desired pigmented material image.

4. The method of claim 1, wherein the foam sheet is formed of a soft, resilient and absorbent material which absorbs pigmented material.

5. The method of claim 3, comprising the additional step of cutting the stencil from a plastic sheet.

6. The method of claim 1, wherein the support surface is substantially horizontal.

7. The method of claim 6, wherein the support surface is a top surface of a table.

8. The method of claim 6, wherein the force applied to the screen mesh sheet is the weight of the screen mesh sheet.

9. The method of claim 1, wherein the force applied to press the screen mesh sheet into the foam sheet is substantially uniformly distributed over the region of the screen mesh sheet to be sprayed with pigmented material.

10. The method of claim 1, additionally comprising the step of inserting fasteners through the screen mesh sheet, thereby pressing the screen mesh sheet firmly against the foam sheet.

11. The method of claim 1, additionally comprising the step of applying force against the screen mesh sheet using a press apparatus.

12. The method of claim 1, wherein said pigmented material is a vinyl dye.

* * * * *